UNITED STATES PATENT OFFICE.

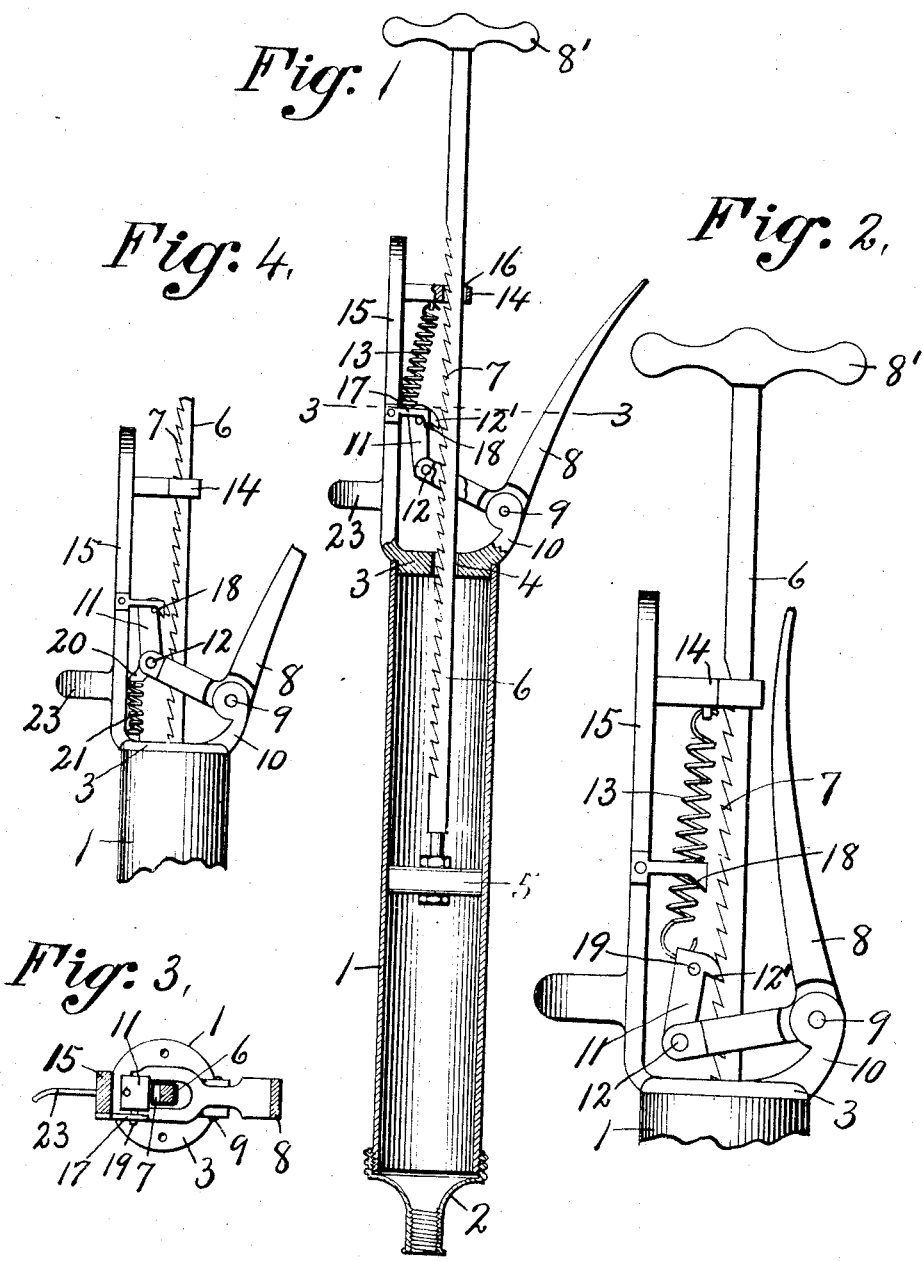

HARRY LE ROY DAVIS, OF SENECA FALLS, NEW YORK.

FORCE-FEED LUBRICATOR.

958,994.  Specification of Letters Patent.  Patented May 24, 1910.

Application filed January 11, 1910.  Serial No. 537,441.

*To all whom it may concern:*

Be it known that I, HARRY L. DAVIS, of Seneca Falls, in the county of Seneca, in the State of New York, have invented new and useful Improvements in Force-Feed Lubricators, of which the following, taken in connection with the accompanying drawings, is a full, clear, and exact description.

This invention relates to certain improvements in force feed lubricators of the hand operated type commonly known in the trade as " grease guns" and comprising a cylinder for the lubricant, a piston movable in the cylinder and manually operated means for advancing the piston, step by step, to expel the lubricant therefrom through the discharge nozzle and into the bearings of automobiles and other machines where gravity feed is impracticable or unreliable.

I am aware that it is not broadly new to provide manually operating means for advancing a piston, step by step, in a cylinder for injecting a lubricant therefrom, but in all of those with which I am familiar the pawl action for effecting such step by step movement is unreliable for any great length of time or period of use and the main object of my present invention is to render this step by step movement more positive and enduring and less liable to get out of repair in the hands of inexperienced operators. To this end the piston rod is provided with a toothed rack, the teeth of which are adapted to be successively engaged by a lever operated pawl for advancing the piston step by step, one or more teeth at a time, as the lever is operated.

Another object is to retract the lever and to force the pawl into engagement with the teeth of the rack by means of a single spring.

A further object is to provide a simple means for disengaging the pawl from the teeth of the rack when the lever is retracted by the spring, so as to leave the piston and piston rod free to be operated by hand independently of the lever and pawl.

Other objects and uses relating to specific parts of the device will be brought out in the following description.

In the drawings: Figure 1 is a longitudinal vertical sectional view partly in elevation of a force feed lubricating device embodying the various features of my invention, the lever and pawl being shown in their normal positions. Fig. 2 is an enlarged elevation of the upper portion of the device showing particularly the piston operating mechanism in its operative position for advancing the piston. Fig. 3 is a transverse sectional view taken on line 3—3, Fig. 1. Fig. 4 is an elevation of the upper portion of a grease gun showing a slightly modified form of a piston operating mechanism in which the retracting spring for the lever is interposed between the heel of the pawl and head of the cylinder, but located so as to force the pawl into operative engagement with the teeth of the rack when the lever is rocked to its operative position.

The grease, or other lubricant, is placed within one end of a suitable cylinder —1— such end being provided with a discharge nozzle —2— screwed thereon and adapted to be removed to permit the cylinder to be easily filled with such lubricant. The opposite end of the cylinder is closed by a suitable cap —3— having a central opening —4— which, in this instance, is angular in cross section.

Movable in the cylinder is a piston —5— having an outwardly projecting stem —6— which is also angular in cross section to slide easily through the opening —4— through which it projects. The piston rod —6— is provided on one side with a toothed rack —7— extending the greater portion of its length the outer end of the piston rod being provided with a handle —8'— by which the rod and piston may be operated back and forth. A hand lever —8— of the bell crank type is pivoted at —9— to an upwardly projecting arm —10— on the head —3— one arm of said lever constituting a handle running lengthwise of the piston rod some distance above the head —3—. The other arm of the lever is bifurcated or slotted to receive the upwardly projecting rod —6— which extends therethrough, that is, the short arm of the lever which is pivotally supported at one side of the piston rod extends to the opposite side thereof, just above the head —3— with sufficient clearance to allow its vertical play.

A pawl —11— is pivoted at its lower end at —12— to the short arm of the lever —8— adjacent to the toothed rack —7— and extends upwardly from its pivot, the upper end being provided with a tooth —12'— adapted to successively engage the teeth of the rack as the handle of the lever —8— is pressed inwardly by hand toward the piston rod, thereby rocking the short arm of the lever downwardly to advance the piston. A spring —13— has one end connected to the upper end of the pawl —11— and its other end connected to a guide arm —14— projecting laterally from an upright bracket —15— rising from the head —3—, said guide arm being provided with a vertical guide opening —16— through which the piston rod —6— extends. The spring —13— is connected to the pawl —11— at a point to one side of a straight line drawn between the pivot —12— and point of connection of said spring with the arm —14— in such manner as to force said pawl into engagement with the teeth of the rack —7— when the lever —8— is forced to its operative position, as shown in Fig. 2.

Rigidly secured to the bracket —15— is a laterally projecting arm —17— having its free end provided with a downwardly inclined cam or beveled face —18— which lies in the path of and is adapted to be engaged by a pin or stud —19— on one side of the upper end of the pawl —11—, so that when the lever —8— is retracted by the spring —13— thereby elevating the pawl —11—, the pin —19— will ride against the upwardly and rearwardly inclined cam face —18— and thereby cause said pawl to be withdrawn from operative engagement with the teeth of the rack, leaving said rack and piston free to be drawn upwardly or operated back and forth by means of the handle —8'—, if desired, independently of the operating lever —8—.

In Fig. 4 I have shown a slightly modified form of operating mechanism for the piston in which the pawl is provided with a laterally projecting heel —20— at one side of its pivot —12— and adapted to be engaged by one end of a compression spring —21— having its other end resting upon the upper end of the head —3—, said spring serving the same purpose as the spring —13— to retract the lever —8— and also to force the pawl —11— into engagement with the teeth of the rack —7— when the lever —8— is pressed inwardly by hand against the action of its retracting spring, thereby drawing the pin —19— of the pawl —11— out of engagement with the cam tooth —18—, otherwise the mechanism is substantially the same as that shown in Figs. 1, 2 and 3.

It will be seen upon reference to the foregoing description and accompanying drawings, that the pawl and rack operating in the manner described afford a positive and durable means for advancing the piston, step by step, as the lever —8— is operated by hand and retracted by the spring —13— or —21— and that cam tooth —18— coacting with the shoulder or pin —19— also affords a positive means for disengaging the pawl from the piston rod when the lever is in its normal position leaving the piston and its piston rod free to be moved back and forth by means of a handle —8'—.

The piston rod —6— and guide opening —4— in the head —3— are preferably square in cross section and serve to hold the rod against turning with its toothed side adjacent the pawl —11—, the guide openings —4— and —16— being of sufficient size to permit free movement of the piston rod therein without excessive friction.

The bracket —15— is provided near the head or cap —3— with a laterally projecting thumb piece —23— adapted to be engaged by the hand when operating the lever —8— to enable the operator to obtain a better grip on the device, the bracket —15— also serving as a portion of the handle for holding the device in operative position.

What I claim is:

1. A force feed device for lubricants, comprising a cylinder having a discharge nozzle on one end and a guide opening in its opposite end, a piston movable in the cylinder and provided with a piston rod having a toothed rack on one side running lengthwise thereof, a lever operatively mounted on the cylinder, a pawl on the lever adapted to engage said rack and advance the piston as the lever is operated, and a spring operatively connected to the pawl to force the same into engagement with the rack when the lever is operated, said spring also operating through the medium of the pawl to retract the lever.

2. A force feed lubricating device, comprising a cylinder having a nozzle on one end and a guide opening in its opposite end, a piston movable in the cylinder and provided with a rod extending outwardly through said openings, a toothed rack on the rod, a bell crank lever operatively mounted on the cylinder having a long arm and a short arm the long arm constituting a handle and the short arm extending laterally beyond the rod and provided with an opening for receiving said rod, a pawl pivoted to the short arm of the lever and spring pressed against the rack when the lever is operated, said spring operating to retract the lever, a pin projecting laterally from one side of the pawl, a bracket on the cylinder, and a cam tooth on the bracket having its cam face in the path of movement of the pin on the pawl for engaging said pin and withdrawing the pawl from engagement with the rack when the lever is retracted to its normal position.

In witness whereof I have hereunto set my hand on this 8th day of January 1910.

HARRY LE ROY DAVIS.

Witnesses:
JOHN C. DAVIS,
E. M. PERRY.